Feb. 1, 1944.  H. O. PUTT  2,340,427
CENTRIFUGAL IMPELLER FOR AIRCRAFT AND OTHER USES
Filed June 26, 1942  3 Sheets-Sheet 1

Inventor
Harlie O. Putt,
By Lester L. Sargent
Attorney

Feb. 1, 1944.  H. O. PUTT  2,340,427
CENTRIFUGAL IMPELLER FOR AIRCRAFT AND OTHER USES
Filed June 26, 1942  3 Sheets-Sheet 2
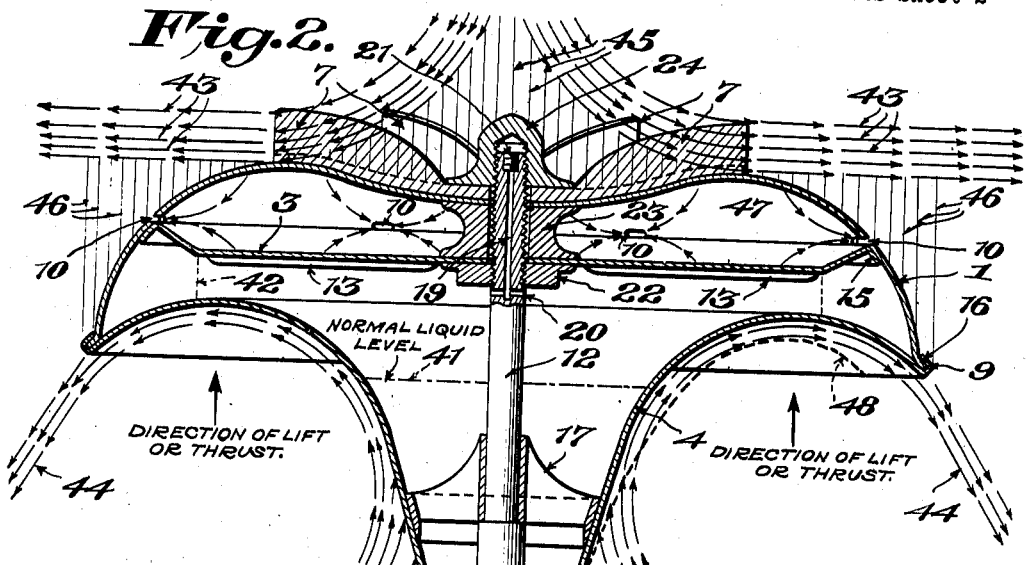
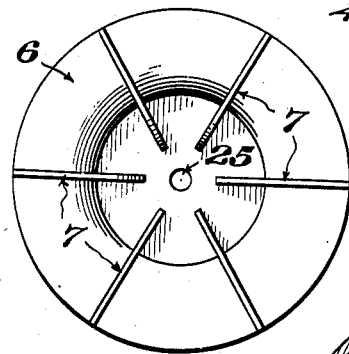
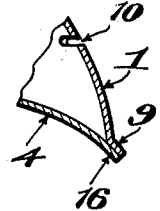
Inventor
Harlie O. Putt,
By Lester L. Sargent
Attorney

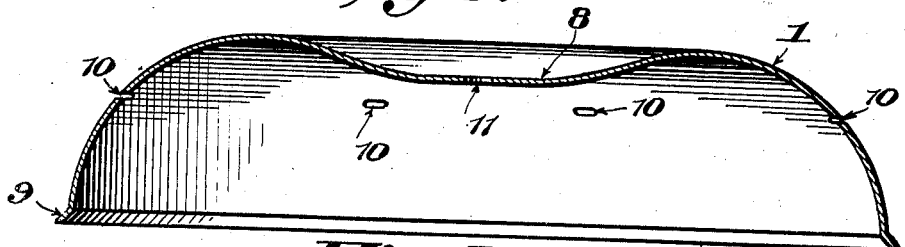
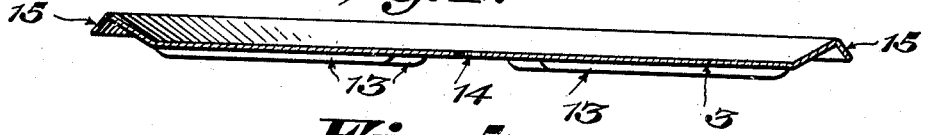
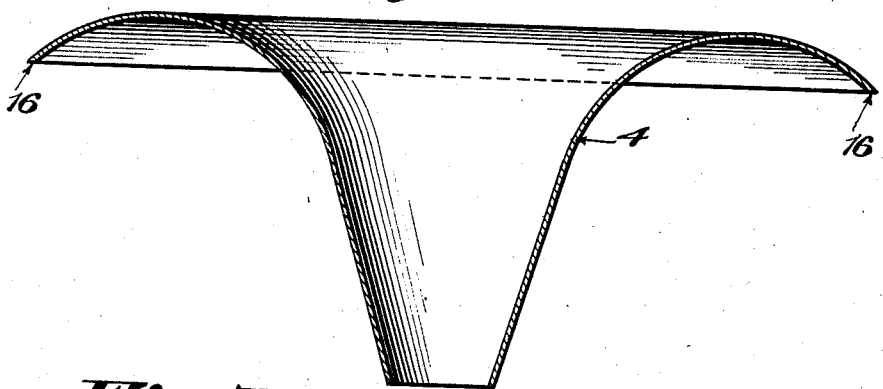
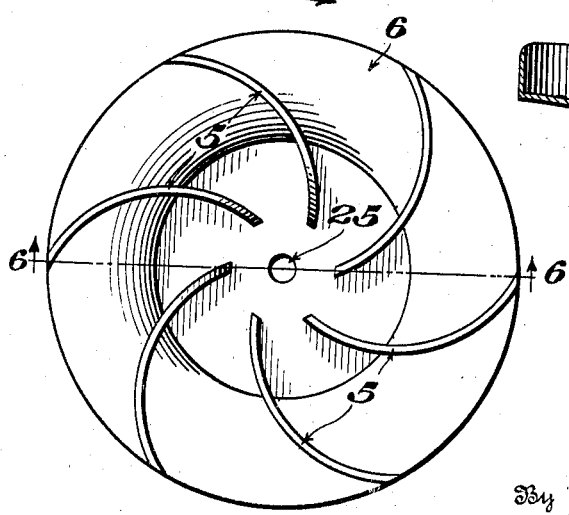
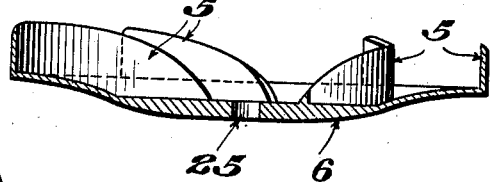

Patented Feb. 1, 1944

2,340,427

UNITED STATES PATENT OFFICE 2,340,427

CENTRIFUGAL IMPELLER FOR AIRCRAFT AND OTHER USES

Harlie O. Putt, Elkhart, Ind.

Application June 26, 1942, Serial No. 448,635

9 Claims. (Cl. 170—135)

The object of my invention is to provide a method and means of creating a greater thrust or traction effort by means of the developed vacuum and pressure effect, per unit of effective area and power input, than can be achieved with the conventional aircraft propeller, in a manner hereinafter fully explained.

A further object is to provide an aerial impeller, comprising a circular rotary air-foil, of strong and simple structure and capable of being driven at relatively high speeds, whereby a maximum thrust effort is developed by a high velocity centrifugal displacement of air over said air-foil, at approximately right angles to the axis of rotation.

It is also an object to provide an impeller structure capable of being employed for both vertical and horizontal flight and thus eliminate the conventional aircraft wing structure and propeller.

A further object of the invention is to provide a method and means for the operation of my invention by centrifugal forces to effect vertical or forward thrust when rotating in one direction and a centripetal, or reverse action when rotating in a reverse direction.

It is also an object to provide means whereby the vertical and forward thrust will result, regardless of the direction of impeller rotation; and to provide method and means whereby the dynamic balance of the impeller may be automatically maintained, as hereinafter explained and described.

I attain these and other advantages of my invention by the structure illustrated in the accompanying drawings and herein described, in which—

Fig. 2 is a vertical sectional view of Fig. 1 on a center line through Fig. 1;

Fig. 3 is a detail vertical sectional view of the circular rotary air-foil impeller head;

Fig. 4 is a detail vertical sectional view of the vacuum plate;

Fig. 5 is a detail vertical sectional view of the cone-shaped lower member;

Fig. 6 is a vertical sectional view of one form of rotary fan on the center line 6—6 of Fig. 7, showing the curved vanes formed integral with their base plate;

Fig. 7 is a top plan view of the rotary fan, showing the curved fan vanes;

Fig. 8 is a top plan view of the rotary fan shown in Fig. 1, showing the straight vanes formed integral with their base plate; and Fig. 9 is a modification of the weld between the impeller head and the cone-shaped lower member.

Like numerals designate like parts in each of the several views.

Figure 1:
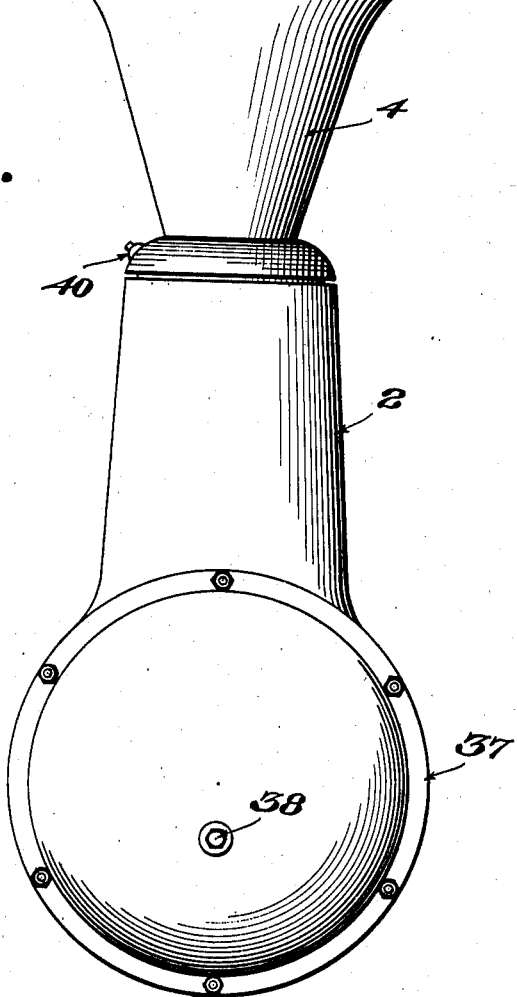
Figure 1 is a plan view of the circular rotary air-foil impeller mounted in its driving housing.

Referring to the drawings, I provide a circular formed air-foil head 1, shaped approximately as shown in Figs. 2 and 3. On its top side and centrally located, is formed a circular depression or concave area 8, in which the rotary fan, as shown in Figs. 7 or 8, is emplaced and rigidly attached thereto. A plurality of slots or ports 10 are equally disposed circumferentially in the air-foil head, as shown and their number should equal the number of vanes employed on the fan. Ports 10 function to create a vacuum between the inner walls of the head 1 and the vacuum plate 3 to increase the strength or stiffen these members against the action of centrifugal force on them by virtue of the vacuum pulling them toward each other. A centrally disposed clearance hole 11 is provided to accommodate the upper end of the reduced shaft 12, as shown. The lower edge or rim of member 1 is slightly flanged as shown at 9, to form a seal with the outer flared edge 16 of the bell-shaped member 4, as shown at 9—16 of Fig. 2.

A suitably formed circular vacuum plate 3, as shown in Figs. 2 and 4, is provided with a plurality of radially disposed ribs 13 and a central hole 14. The outer rim of this plate is formed with the flange 15 to accurately fit the internal curved wall of the air-foil head 1 just below the ports 10, as shown in Fig. 2.

A threaded nut 22 (see Fig. 2) is screwed tightly on the threaded shaft 12 to a point just above the transverse hole 20 drilled through said shaft. Then the vacuum plate 3 and spacer 23, both of which have centrally located clearance holes, are placed in position on the shaft, followed by the head 1, and fan 7, also having clearance holes 11 and 25, respectively. All are rigidly clamped together by means of the threaded nut 24; then the flange 15 of the plate 3 is welded, fluid tight, to the head 1 in the position shown in Fig. 2.

The shaft may now be removed and the circular ribbed brace 17 and end plug 18 (Fig. 2), pressed or shrunk onto the reduced portions of the shaft as shown, and finished to fit snugly within the cone-shaped member 4, to which they should be welded or brazed and the plug 18 made fluid tight therewith. A hole 19 is drilled in the upper end of the threaded shaft 12 to communicate with the transverse hole 20 and this hole 19 is counterbored and tapped for the screwplug 21, the purpose of which will be explained hereinafter.

Now the shaft may again be inserted in the assembled members 1, 23 and 3 and the fan 7 secured rigidly in place by the nut 24 and the seal between the outer edges of members 1 and 4 made as shown at 9—16 (Fig. 2) or otherwise, to form a strong, fluid tight seal around the entire peripheral edge of the impeller head.

The upper bearing 27 is now emplaced on the bearing hub 26, which is then assembled within the bearing housing 2, where it is held rigidly by the jam-nut 28 which is locked in position by the screw 29, or by other suitable means. The lower end of the impeller shaft 12 is now inserted into the bore of the hub 26 until the tapered lower end of member 4 seats securedly and accurately in the tapered bore of said hub. The lower bearing 30 is now emplaced and the lock nut 31 tightened up securely, thus clamping bearing 30 in place and drawing the lower tapered end of member 4 tightly into its seat in the upper end of the hub 26, as shown. The beveled pinion gear 32 is now emplaced on the lower tapered end of the shaft 12, properly meshed with the beveled drive gear 33 and locked in place with the lock-nut 35, as shown. The shaft 36 extends rearward to the power source (not shown) whereby the impeller may be driven at any desired speed and in the desired direction of rotation. The gear housing 37 may be filled with lubricant through the filler plug opening 38 (Fig. 1) and drained through the plug opening 39. The lower bearing 30 receives its lubricant from the gear housing, while the upper bearing 27 is lubricated through the grease nipple 40 in the jam nut 28, or otherwise.

Because my impeller structure is designed to be driven at relatively high speeds, it will be seen that the drive end of the shaft 12 may be directly coupled to a suitable steam turbine rotor shaft, or other high speed heat engine and driven directly thereby without gears or other transmission devices and this is the preferred type or method of drive.

It is essential that the entire impeller structure be constructed accurately and rotate with a minimum of vibration at all speeds. However, in order to neutralize any slight unbalance, I provide for the use of a fluid which is normally positioned within the lower internal portion of the member 4, to act as an automatic vibration damper or harmonic balancer. This fluid may be a light oil and is introduced through the hole 19 by removing the clamp nut 24 and the screw plug 21. After the proper quantity of fluid is injected—say up to the normal fluid level indicated by the dotted line 41 in Fig. 2, plug 21 and nut 24 are securely replaced. When the impeller is rotated at sufficient speed, the fluid in the bell or cone-shaped member 4 is thrown upwardly and outwardly throughout the internal periphery of the air-foil head 1, below the vacuum plate 3, by centrifugal action, the fluid position therein being indicated by the vertical dotted lines 42, when the impeller is rotating at top speed. Thus, if vibration tends to develop, due to slight unbalance, it is instantly damped or neutralized by the action of the fluid surging or moving toward the diametrically opposed position or point of unbalance. The greater the degree of unbalance and higher the speed of rotation, the greater the quantity of fluid displaced to effect balance.

When the impeller is operated in the horizontal position, all fluid will flow from the bell-shaped member 4 into the head compartment back of the vacuum plate 3 and is distributed equally throughout the internal periphery thereof when the impeller is rotating at sufficient speed, in the same manner as when it is operated in the vertical position. However, when the impeller is stopped, most of the fluid will remain in the lower portion of the impeller head and for this reason the fluid fill should be proportional to operating conditions or requirements.

The fan shown in Figs. 6, 7 and 8, is preferably cast of suitable material, while the parts 1, 3 and 4 may be made up of suitable sheet material, although they may also be cast and machined to size. In the latter case, the seal shown at 9—16, (Fig. 2) between the members 1 and 4, would be altered to suit requirements. In other words, the extreme edge of member 4 would not be rolled over the extreme edge of flange 9 as shown, but would be flat welded, as shown at Fig. 9, or otherwise secured to same, to effect a fluid tight joint. The internal bracing of the impeller may be of any desired design and character to obtain maximum strength and resistance to the developed stresses, without departing from the character and principle of the invention.

Assume that the impeller has been set up in the vertical position shown and suitably connected to a source of power, so that it may be driven at any desired speed within the centrifugal capacity of the impeller unit and that the fan employed is of the straight vane type shown in Figs. 1, 2 and 8. This fan, regardless of the direction of rotation, will displace air at right angles to the axis, outwardly over the curved air-foil area of the impeller head, as indicated by the curved arrow lines 43 and centrifugal force, acting on the air in contact with the external curved surface of member 4, will displace air in the direction indicated by the curved arrow lines 44.

It is well known that the greater the total effective area of the vanes of an air fan of unit diameter, the greater the power required to drive it at a given speed and it is also well known that it is the velocity and not the volume of the air stream forced over an air-foil surface that develops the vacuum or negative pressure effect. Therefore, it is advantageous to employ a centrifugal air fan of maximum diameter and minimum total area of vanes, whereby the driving power required would be reduced to a minimum to develop and maintain the highest possible vacuum value.

The air displaced radially by the fan creates a partial vacuum, indicated by the vertical lines 45, immediately above or ahead of same and over its central portion and also over the extreme outer curved area of the air-foil surface of member 1, approximately as indicated by the vertical lines 46. The vacuum chamber 47, in the upper or forward end of the impeller head 1, is in continuous communication with the external vacuum area indicated by the vertical lines 46, by means of the slots or ports 10, hence the degree of vacuum within this chamber is always the same as that over the area indicated by said vertical lines 46, and provides for a maximum effective vacuum area for a given diameter of impeller head. The purpose of this internal vacuum is to create an inward pull on the inner surface of the impeller head toward center whereby to neutralize or counteract centrifugal force acting on the impeller mass. Any moisture condensing or otherwise entering the chamber 47 through the ports 10 would be discharged immediately through said ports by centrifugal force, upon rotation of the impeller.

As the centrifugal force, acting on the impeller and fan and the air in contact therewith, is directly proportional to the square of the speed and inversely proportional to the radius of rotation, it will be seen that, at top speed, a very high air stream velocity would be developed, even though the mass or weight of the air was low and that the resultant vacuum and thrust factors per square inch of effective area, would also be of a relatively high order or value.

Now, assume that the impeller is driven at, say two or three hundred R. P. M., the velocity of the air stream 43 and 44 would be of a relatively low order, as would the vacuum area 45 and 46, as the air stream 43 (at atmospheric pressure) would be contacting most of the fan vane and impeller air-foil area, but as the rotative speed is increased, the velocity of all air streams would also increase and a greater vacuum value and area would develop at 45 and 46, with a corresponding increase in the vacuum value within the chamber 47 until, at the maximum R. P. M., air stream 43 (at atmospheric pressure) would contact only the extreme outward portions of the fan vanes, as shown and a maximum vacuum or negative pressure value would be attained over an effective area equal to the flat cross-sectional area of the impeller head, resulting in a powerful vertical or horizontal thrust, according to the position of the impeller.

The high velocity and pressure effect of the air stream 44 adds to the thrust effort by virtue of the curved under surface of the member 4, at or near its outer periphery and also prevents the formation of a vacuum effect at this point when the impeller is moving at maximum speed in either the vertical or horizontal direction. The volume of this air stream is very low, since it is developed by centrifugal action on the air in contact with the smooth surface of the member 4. However, this volume may be increased, if desired, by providing suitable fan vanes within the curved external area of the member 4, as shown by the dotted curved line 48 on one side of the drawings (Fig. 2). Such vanes, however, should not be employed when the curved vane fan, shown in Figs. 6 and 7, is used, for the reason hereinafter explained.

If the impeller is to be employed for vertical and forward horizontal flight only, then the straight fan vanes shown may be used, but if the airship or other craft involved is to be driven in a reverse as well as forward direction, then the curved fan vanes 5, Figs. 6 and 7, should be used, because when this fan (with vanes curved in the direction shown) is rotated clockwise, a centrifugal displacement of the air is achieved, as shown in Fig. 2, employing a straight vane fan, but when the curved vane fan is rotated in the opposite or anti-clockwise direction, it operates in a centripetal action to force air from its periphery toward its central area, thereby increasing the air pressure over this area and thus force the craft to move backward, or oppose its forward motion and bring it to a stop. This centripetal action will not be as powerful as the centrifugal action because the effective area is very much less and for this reason the volume of the air stream 44, (Fig. 2) should be of minimum value, as it will oppose the centripetal action of the curved vane fan.

The required operating speed of this device, to achieve maximum efficiency, may be very much higher than that of the conventional propeller and it is designed to operate at speeds up to fifteen thousand or more R. P. M., according to diameter. The maximum speed for any given diameter of impeller head is limited only by the ability of the structure to withstand the centrifugal stresses developed, hence it should be constructed of strong, light weight material. However, centrifugal force operates to increase the rigidity of the structure and, in the vertical position, gyroscopic force acts to stabilize the impeller and the craft on which it is installed. It may be constructed in any size up to twelve or more feet in diameter, providing it is properly and sufficiently braced internally and constructed of the proper materials. Its efficiency increases with diameter, even at correspondingly reduced speeds.

For instance, disregarding air slippage or losses, an impeller one foot in diameter, with an effective area of 113 square inches and a fan eight inches in diameter, rotating at 15,000 R. P. M. would develop an indicated thrust of approximately 971 pounds, while an impeller three feet in diameter, with an effective area of slightly over one thousand square inches and a fan 24 inches in diameter, rotating at 5,000 R. P. M. would develop an indicated lift or thrust of approximately 8,746 pounds, while the velocity of the air stream 43 and 44, in both cases, would be practically the same, as would also the power input, assuming that the width of the fan vanes is the same and that a partial vacuum of approximately 17 inches would be developed in both cases.

While this impeller is designed to provide a direct and powerful vertical lift for air craft and thus eliminate the necessity of employing the conventional wing structure, it may also be employed in any application where the conventional propeller or air screw is now used and with greater efficiency. It may also be advantageously employed on specially designed, high speed, light weight marine craft, instead of the conventional marine propeller. The circular rotary air-foil, with its developed centrifugal forces, prevents the formation of ice upon its surface under the severest conditions and thus insures a maximum vacuum effect and operating efficiency at all times.

It is practically noiseless in operation. Only a low pitched, humming note would be audible within close range. For this reason, when employed with suitably designed air or marine craft and powdered with noiseless, high pressure gas turbines, directly coupled to each impeller, it would be invaluable in the war program in many different ways. On an equivalent production basis, it would cost no more, if as much, as a modern controllable pitch air craft propeller, and when employed with suitably designed air craft, it would provide all the advantages of the helicopter type of craft, plus greater efficiency and load capacity per unit of power, whereby relatively large transport units may be constructed and operated with superior results.

What I claim is:

1. An impeller for aircraft, comprising a rotary air-foil, comprising a circular air-foil head having a central concave area, and having radiating fan blades projecting from the air-foil head, and having a plurality of ports disposed circumferentially of the air-foil head, and having a bell shaped member having its edge secured to the edge of the air foil head a vacuum plate mounted in the air-foil head, and means for driving said members at relatively high speed.

2. An impeller for aircraft, comprising a rotary air foil having a curved head having a concave central portion, and having projecting radiating fan blades mounted on the outer surface of the air-foil head to effect centrifugal action and create a vacuum directly in front of the head, and a bell-shaped member having its outer annular edge affixed to the edge of the air-foil head, and a vacuum plate in the air-foil head having its central portion spaced from the central portion of the air-foil head, and having its outer annular edge affixed to the internal curved surface of the air-foil head, and means to maintain a vacuum between the aforesaid head and the vacuum plate for the purpose of neutralizing the action of centrifugal force acting on the impeller mass.

3. An impeller for aircraft, comprising a circular rotary airfoil having a curved head having a concave central portion, projecting longitudinally curved fan blades mounted on the outer surface of the airfoil head to effect centrifugal action and create a vacuum directly in front of the head, a bell-shaped member having its outer annular edge affixed to the edge of the airfoil head, the airfoil head having spaced ports, and a vacuum plate in the airfoil head having its central portion spaced from the central portion of the airfoil head and its outer annular edge affixed to the internal curved surface of the airfoil head.

4. An impeller for aircraft, comprising a circular airfoil head having a central concave area, radiating fan blades projecting from the air-foil head, a plurality of ports disposed circumferentially of the air-foil head, a bell-shaped member having its edge secured to the edge of the air-foil head, means for driving said members at relatively high speed, and a circular vacuum plate mounted in the air-foil head, said plate having a plurality of radially disposed ribs, the outer edge of said plate having a flange engaging the internal curved wall of the air-foil head just below the aforesaid ports in the air-foil head.

5. An impeller for aircraft, comprising a circular air-foil head having a central concave area, radiating fan blades projecting from the air-foil head, a plurality of ports disposed circumferentially of the air-foil head, a bell-shaped member having its edge secured to the edge of the air-foil head, means for driving said members at relatively high speed, and a circular vacuum plate mounted in the air-foil head, said plate having a plurality of radially disposed ribs, the outer edge of said plate having a flange engaging the internal curved wall of the air-foil head just below the aforesaid ports, and means for mounting said plate in spaced relation to the central portion of the air-foil head.

6. An impeller for aircraft, comprising a circular aid-foil head having a central concave area, radiating fan blades projecting from the air-foil head, a plurality of ports disposed circumferentially of the air-foil head, a bell-shaped member having its edge secured to the edge of the air-foil head, means for driving said members at relatively high speed, a circular vacuum plate mounted in the air-foil head in spaced relation to said head, the outer edge of said plate engaging the internal curved wall of the air-foil head just below the aforesaid ports, a central shaft on which the air-foil head is secured, means on said shaft spacing the air-foil head and the vacuum plate apart, and a bearing housing in which said shaft is mounted.

7. An impeller for aircraft, including a rotary air-foil having a central concave area, and having radiating fan vanes, and having a plurality of ports in the air-foil head, and a bell-shaped member having its outer annular edge secured to the edge of the air-foil head, and ports disposed circumferentially of the air-foil head, whereby a developed vacuum and pressure effect may be created, the vacuum being created over the outer surface of the air-foil head and the thrust being exerted against the bell-shaped member, substantially as described and shown.

8. In combination with the mechanism defined in claim 7, said blades being smallest near the center of the air-foil head and gradually expanding in area toward the rim of said head, but not extending to the rim thereof, and a driven shaft on which said air-foil head and bell-shaped member and vacuum plate are rigidly mounted.

9. An impeller for aircraft, comprising a rotary air-foil, including a circular air-foil head having a central concave area, radiating fan blades projecting from the air-foil head, a plurality of ports disposed circumferentially of the air-foil head, a bell shaped member having its edge secured to the edge of the air-foil head, a circular vacuum plate mounted in the air-foil head, said plate having a plurality of radially-disposed ribs, the outer edge of said plate having a flange engaging the internal curved wall of the air-foil head just below the aforesaid ports, means for mounting said plates in spaced relation to the central portion of the air-foil head, the lower portion of the bell-shaped member being filled with liquid whereby when the device is operated centrifugal action will throw the liquid upwardly and outwardly to neutralize any unbalance due to the action of the fluid moving toward the diametrically opposed position or point of unbalance, and means for driving all of said members at relatively high speed.

HARLIE O. PUTT.